US006907471B2

(12) United States Patent
Dionne et al.

(10) Patent No.: US 6,907,471 B2
(45) Date of Patent: Jun. 14, 2005

(54) EQUIPPING DATA OBJECTS WITH ATTRIBUTES AND MANAGING DUPLICATION OF SAME FOR DATA SHARING

(75) Inventors: Carl Dionne, Montreal (CA); Martin Lavoie, Longueuile (CA)

(73) Assignee: Proksim Software Inc., Montreal (CA)

( * ) Notice: Subject to any disclaimer, the term of this patent is extended or adjusted under 35 U.S.C. 154(b) by 816 days.

(21) Appl. No.: 09/801,878

(22) Filed: Mar. 9, 2001

(65) Prior Publication Data

US 2002/0120688 A1 Aug. 29, 2002

(30) Foreign Application Priority Data

Feb. 23, 2001 (GB) .............................................. 0104487

(51) Int. Cl.$^7$ .............................................. G06F 15/16

(52) U.S. Cl. ..................... 709/248; 709/203; 709/223; 709/246; 707/10

(58) Field of Search .......................... 709/23–224, 246, 709/248; 707/10; 719/316

(56) References Cited

U.S. PATENT DOCUMENTS

| 5,522,041 A | * | 5/1996 | Murakami et al. .......... 709/203 |
| 5,729,735 A | | 3/1998 | Meyering ..................... 707/10 |
| 5,772,512 A | | 6/1998 | Chichester ................... 463/40 |
| 5,838,909 A | | 11/1998 | Roy et al. .................... 709/209 |
| 5,879,236 A | | 3/1999 | Lambright .................... 463/42 |
| 5,978,787 A | | 11/1999 | Wong et al. .................... 707/2 |
| 6,041,350 A | * | 3/2000 | Takimoto .................... 709/223 |
| 6,205,478 B1 | * | 3/2001 | Sugano et al. ............... 709/223 |
| 6,269,394 B1 | | 7/2001 | Kenner et al. ............... 709/217 |
| 6,493,748 B1 | * | 12/2002 | Nakayama et al. ......... 709/218 |
| 6,834,289 B2 | * | 12/2004 | Kaneda et al. .............. 709/223 |

OTHER PUBLICATIONS

Craymer et al, "A Scalable RTI–Compatible Interest Manager for Parallel Processors" In Proceedings of the 1997 Spring Simulation Interoperability Workshop, 1997, 97S–SIW–154.

van Hook et al, "Approaches to Relevance Filtering", In Eleventh Workshop on Standards for the Interoperability of Distributed Simulations, 1994.

van Hook et al, "Approaches to TRI Implementation of HLA Data Distribution Management Services", In Proceedings of the 15$^{th}$ Workshop on Standards for the Interoperability of Distributed Simulations, 1996.

Petty et al, "Experimental Comparison of d–Rectangle Intersection Algorithms Applied to HLA Data Distribution", In Proceedings of the 1997 Fall Simulation Interoperability Workshop, 1997, 97F–SIW–016.

Singhal, Effective Remote Modeling in Large–Scale Distributed Simulation and Visualization Environments, PhD Thesis, Stanford University, 1996.

Singhal et al, "Using a Position History–Based Protocol for Distributed Object Visualization", In Designing Real–Time Graphics for Entertainment [Course Notes for SIGGRAPH '94 Course No. 14], Jul. 1994.

* cited by examiner

*Primary Examiner*—Bharat Barot
(74) *Attorney, Agent, or Firm*—Nixon & Vanderhye P.C.

(57) ABSTRACT

Data is shared over a network, having a plurality of network-connected terminals, each including a visual display processor, storage and memory. The memory is configured to store program instructions for equipping objects stored therein with attributes and for managing the duplication of the objects. The processor is configurable by the program instructions to perform the steps of equipping an object with attributes at a first of the network terminals; at a second of the network terminals, matching the object attributes of the first terminal with the attributes of an object amongst all of the objects stored in the second terminal; duplicating the object from the second terminal to the first terminal; at the first terminal, accessing data in the duplicated object using locally executed object instructions; and maintaining data consistency between the duplicated objects.

22 Claims, 17 Drawing Sheets

| | |
|---|---|
| 701 | Title "2-for-1 offer"; |
| 702 | # include <2-for-1.h> |
| 703 | Void main (void) { |

| | | |
|---|---|---|
| | 704 | Define PromotionSpace; |
| | 705 | Client * pClient = Client : : Create(); <br><br> // initialise the client attributes |
| | 706 | pClient ⟶ Publish(); <br><br> // will eventually discover relevant promotion |
| | 707 | Promotion * pPromotion = Promotion : : Create(); <br><br> // initialise the promotion attributes |
| | 708 | pPromotion ⟶ Publish(); <br><br> // will eventually discover relevant client |
| | } | |

*Figure 7*

901 $S_n = S_1 \cup S_2 \cup \ldots \cup S_n$

902 $P_m = P_1 \cup P_2 \cup \ldots \cup P_m$

903 $C_{1,1} = S_1 \cup P_1$ $C_{1,2} = S_1 \cup P_2$

904 $C_{1,m} = S_1 \cup P_m$

905 $C_{n,m} = S_n \cup P_m$

906 $R = C(P) \times C(S)$

907 $R = \dfrac{C(S) \times C(P)}{(n \times m)}$

908 $C_{n,n} = S_n \cup P_n$

*Figure 9*

EQUIPPING DATA OBJECTS WITH ATTRIBUTES AND MANAGING DUPLICATION OF SAME FOR DATA SHARING

BACKGROUND OF THE INVENTION

1. Field of the Invention

The present invention relates to a method of sharing data over a network, having a plurality of network connected terminals, each comprising memory means and processing means, said memory means including instructions for equipping objects with attributes and managing the duplication thereof.

2. Description of the Related Art

Methods according to which users share data as information or content between their respective terminals being connected to a network are widely known. The Internet is one such network, wherein user terminals access information stored on web pages in a variety of formats and can also download program files or data files by means of protocols such as file transfer protocol.

However, the users of such user terminals must first locate said information or data amongst the literally millions of web pages which can today be accessed on the Internet. Most of the time said location of information or data is achieved by means of generic search engines, such as Altavista or Lycos, which receive an input string ie keywords, from a user terminal, and match said input string with an identical string stored within a web page. As said matching operation is performed according to character-based Boolean parameters, said generic search engines invariably return thousands and, potentially, hundreds of thousands of hypertext links pointing to mostly redundant matching web pages.

Methods are known which have improved the matching accuracy of said generic internet search engines, for instance with the inclusion of logical characters such as a "plus" or "comma" sign within the input string inputted at the user terminal. In practice, however, said methods according to the known art still fail to reduce the amount of redundant search results down to a reasonable number of entries for a user to consult.

A recent development in Internet connectivity is the development of peer-to-peer networking, wherein users of user terminals connected to the Internet can access information and data stored in their respective user terminals rather than stored in central internet servers. Whereas this development is known to improve problems of bandwidth utilisation and latency which are well known to those skilled in the art, said developments feature the same disadvantages in terms of locating information or data locating as explained above.

BRIEF SUMMARY OF THE INVENTION

According to a first aspect of the present invention, there is provided an apparatus for sharing data over a network, having a plurality of network-connected terminals, each comprising visual display means, processing means, storage means and memory means; wherein said memory means is configured to store program instructions for equipping objects stored therein with attributes and for managing the duplication of said objects. Said processing means is configurable by said program instructions to perform the steps of equipping an object with attributes at a first of said network terminals; at a second of said network terminals, matching said object attributes of said first terminal with the attributes of an object amongst all of the objects stored in said second terminal; duplicating said object from said second terminal to said first terminal; at said first terminal, accessing data in said duplicated object using locally executed object instructions; and maintaining data consistency between said duplicated objects.

According to a second aspect of the present invention, there is provided a method of sharing data over a network, having a plurality of network-connected terminals, each comprising memory means and processing means, said memory means including instructions for equipping objects stored therein with attributes and managing the duplication of said objects, including steps of equipping an object with attributes at a first of said network terminals; at a second of said network terminals, matching said object attributes of said first terminal with the attributes of an object amongst all of the objects stored in said second terminal; duplicating said object from said second terminal to said first terminal; at said first terminal, accessing data in said duplicated object using locally executed object instructions; and maintaining data consistency between said duplicated objects.

BRIEF DESCRIPTION OF THE SEVERAL VIEWS OF THE DRAWINGS

FIG. 7 shows machine readable instructions shown at FIGS. 5 and 6 in order for a duplication space to be instantiated;

FIG. 9 shows the resources required from each user terminal shown in FIG. 1 in order to obtain an attributes match;

BEST MODE FOR CARRYING OUT THE INVENTION

The invention will now be described by way of example only with reference to the previously identified drawings.

Data sharing applications distribute data amongst multiple users using a network of connected computers. An environment for connecting multiple users to whom data will be distributed is illustrated in FIG. 1.

User terminal 101 is connected to the Internet 102 via internet service provider (ISP) 103 and user terminal 104 is also connected to the Internet 102 via internet service provider (ISP) 105. Internet-enabled cellular phone 106 is connected wirelessly to the Internet 102 via Wireless Application Protocol provided by internet service provider (ISP) 107 and Internet-enabled mobile device 108, which is a Palmtop PC, is connected wirelessly to the Internet via internet service provider (ISP) 108.

Each of said ISPs provide each individual user with a unique network address, e-mail account and other optional internet facilities such as are commonly provided to a user with an ISP account. Thus, there is provided the scope for any which one of the above user terminals to access data stored on any which one of the other networked terminals.

Figure 1:
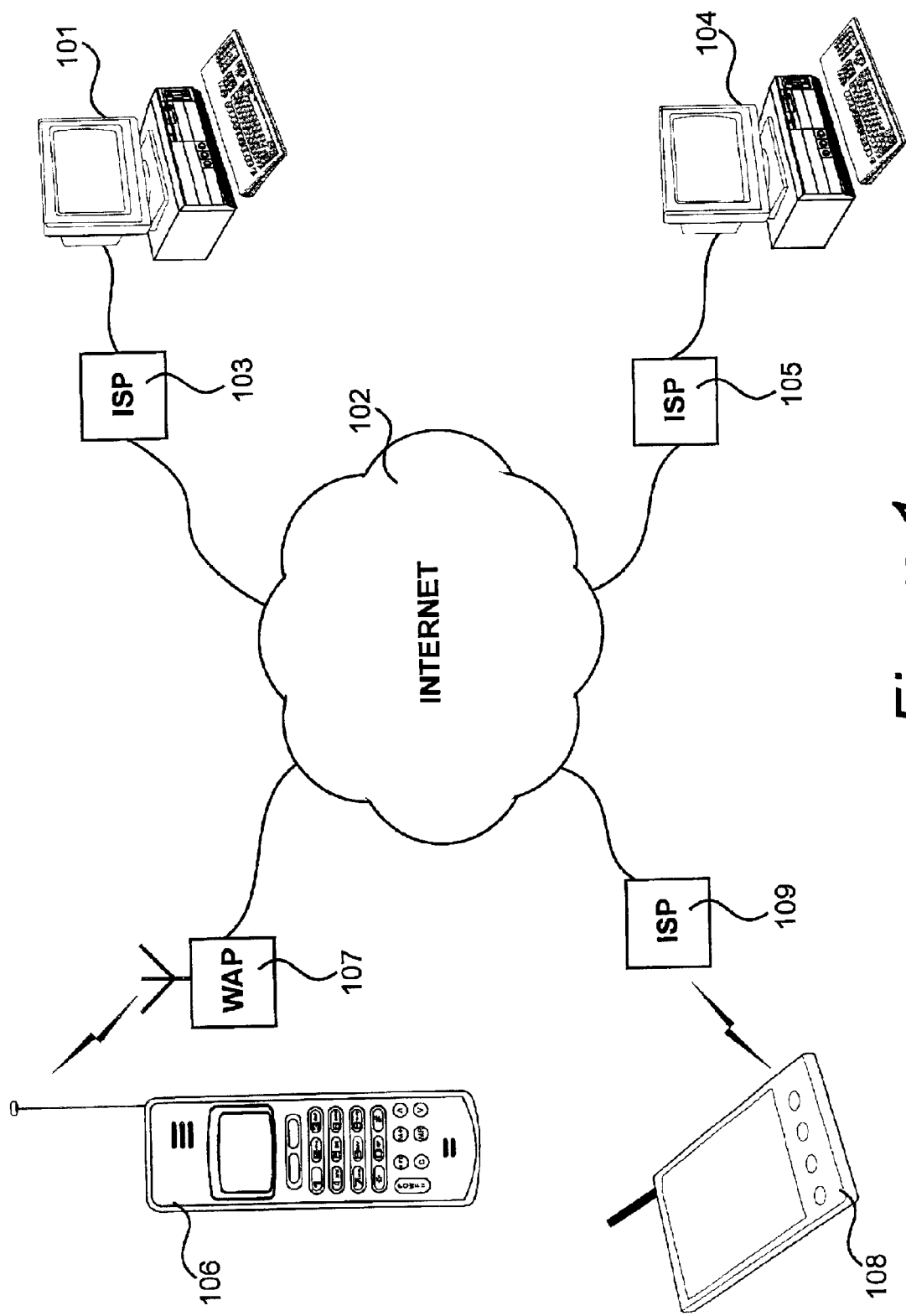
FIG. 1 illustrates a network environment, including user terminals, a cellular phone and a personal digital assistant sharing data over said network environment.

In a preferred embodiment of the present invention, the user terminals sharing data such as shown in FIG. 1 can include many types of devices equipped with processing and displaying means, the respective configurations of which can vary to a fairly large extent.

Figure 2:
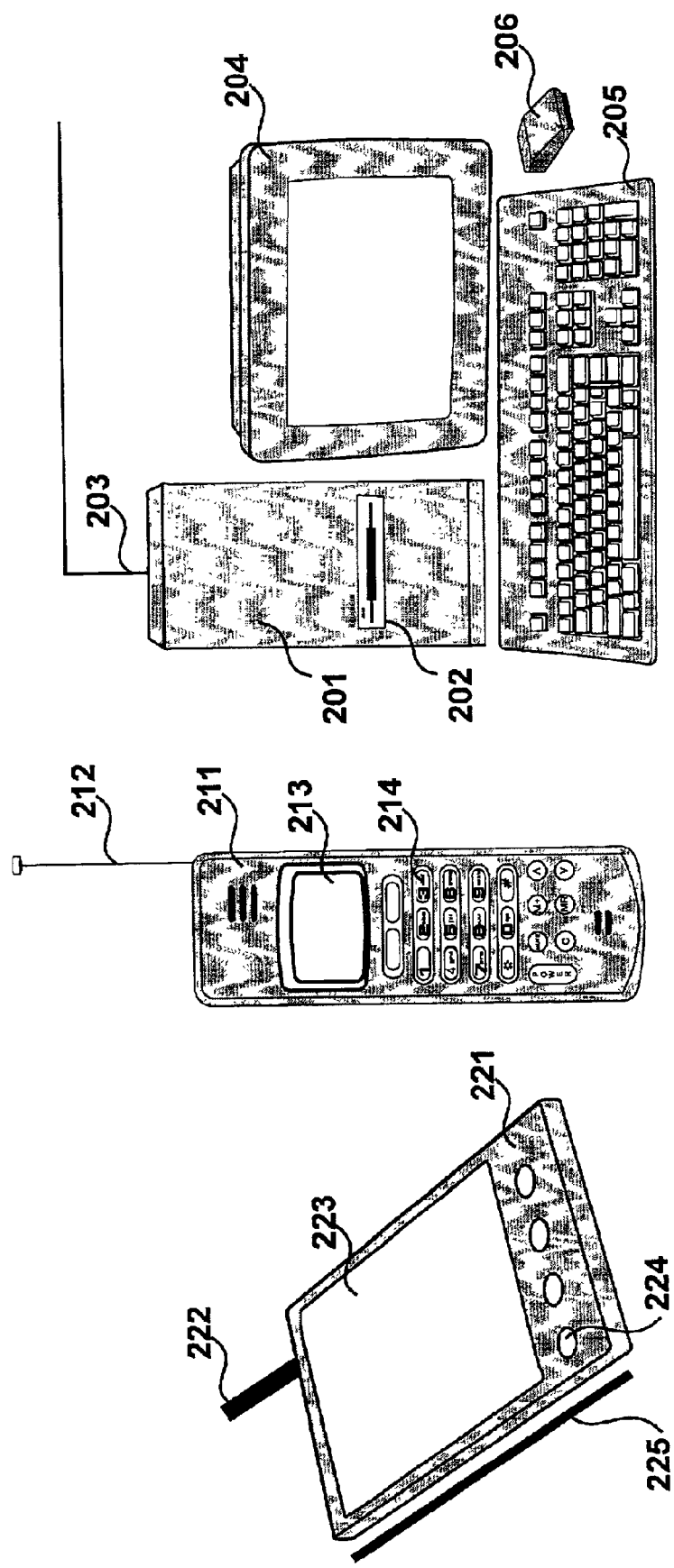
FIG. 2 shows a user terminal, a cellular phone and a personal digital assistant for sharing data.

Personal computer 101, cellular phone 106 and palmtop personal computer 108 are shown in greater detail in FIG. 2.

Programmable computer 201 is shown equipped with a drive 202 able to receive and read from- or write to an external medium. Said external media consist of a 3.5 inch floppy disk, a CD-ROM or a re-writable CD-RAM and are well known to those skilled in the art. Thus, computer 201 may receive data, such as program instructions, via an appropriate medium by means of drive 202. Data may also be received and transmitted over a network, such as the Internet 102, by means of a network connection 203. Output data is displayed on a visual display unit 204 and manual input is received via a keyboard 205 and a mouse 206.

Cellular phone 211 is shown equipped with an antenna 212 through which incoming and outgoing wireless signals are transmitted. Traditionally, cellular phones receive and send data in the form of voice signals by means of their antennae. However, cellular phones equipped with WAP functionality can also receive and transmit data in the form of computer-readable instructions over a network, such as the Internet 102, and thus cellular phone 211 can receive and send data by means of its antennae 212. According to the known art, cellular phone 211 is equipped with a processing capability and memory means. Output data is displayed on a visual display unit 213 and manual input is received via a keypad 214.

Palmtop Personal Computer 221 is also shown equipped with an antenna 222 through which incoming and outgoing wireless signals are transmitted. However, Palmtop PC 221 is not dependent upon WAP functionality and is able to process computer-readable instructions written in Hypertext Mark-up Language (HTML) in an identical fashion to Personal Computer 201. According to the known art, Palmtop PC 221 is equipped with a processing capability and memory means. Output data is displayed on a tactile visual display unit 223 and manual input is received via a number of function-specific keys 224 and a stylus 225, which activates instructions displayed on display 223 by means of its tactility.

Figure 3:
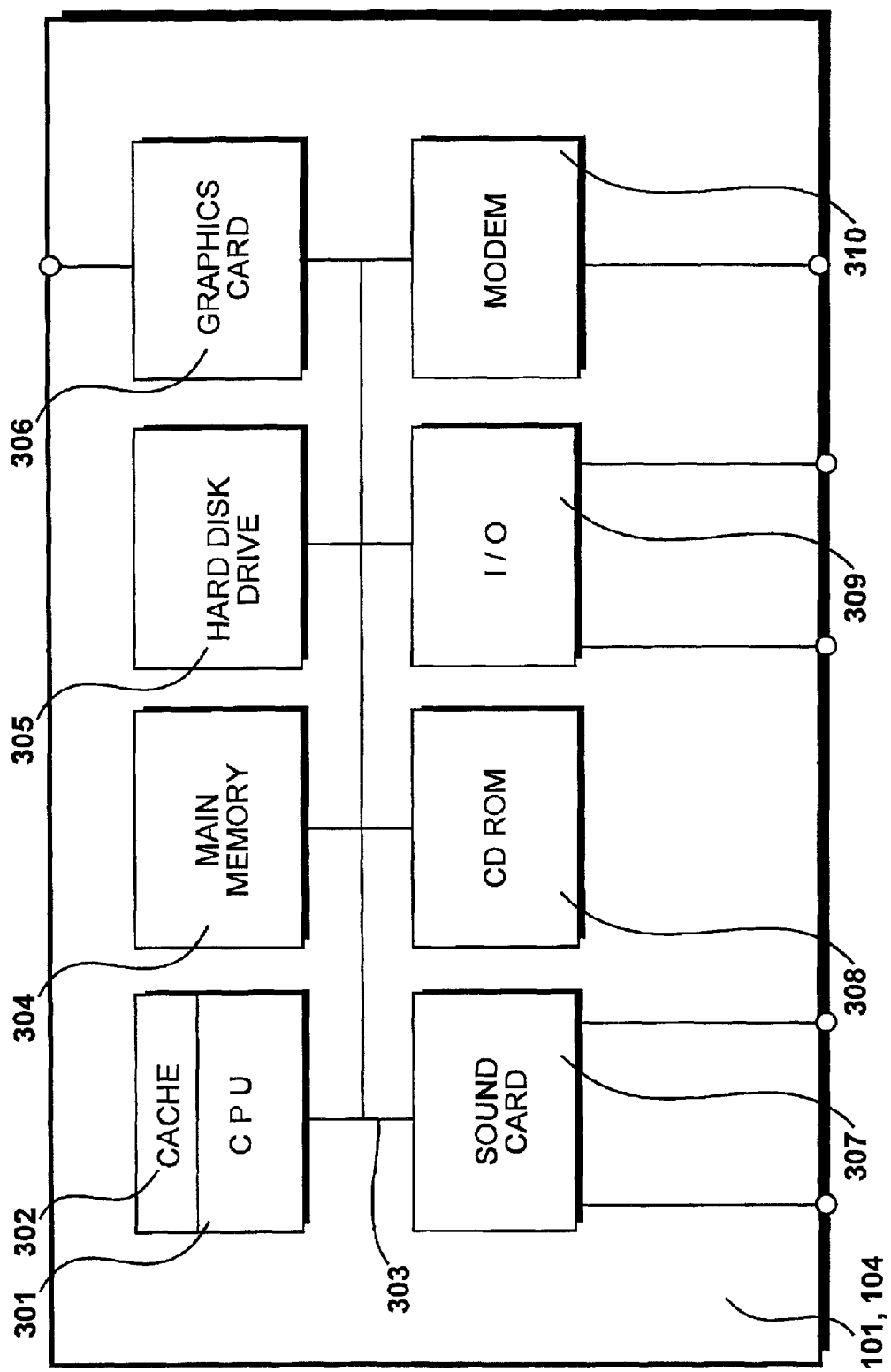
FIG. 3 illustrates the hardware architecture of user terminal shown in FIG. 2.

Hardware forming the main part of computer system 201 are detailed in FIG. 3.

The system includes a Pentium III™ central processing unit (CPU) 301 which fetches and executes instructions and manipulates data. Frequently-accessed instructions and data are stored in a high speed cache memory 302. The central processing unit 301 is connected to a system bus 303. This provides connectivity with a larger main memory 304, which requires significantly more time to access than the cache 302. The main memory 304 contains between one hundred and twenty-eight and two hundred and fifty-six megabytes of dynamic random access memory. A hard disc drive (HDD) 305 provides non-volatile bulk storage of instructions and data. A graphics card 306 receives graphics data from the CPU 301, along with graphics instructions. Similarly, a sound card 307 receives sound data from the CPU 301, along with sound processing instructions. A CD-ROM reader 308 receives processing instructions and data from an external CD-ROM medium. A serial bus interface 309 provides connectivity to peripherals such as a mouse 206 and keyboard 205. A modem 310 provides connectivity to the Internet 102 via a telephone connection to the user's ISP 103. The equipment shown in FIG. 3 constitutes a personal computer of fairly standard type, such as a PC or Mac, whether used as a network terminal or as a network server.

Figure 4:
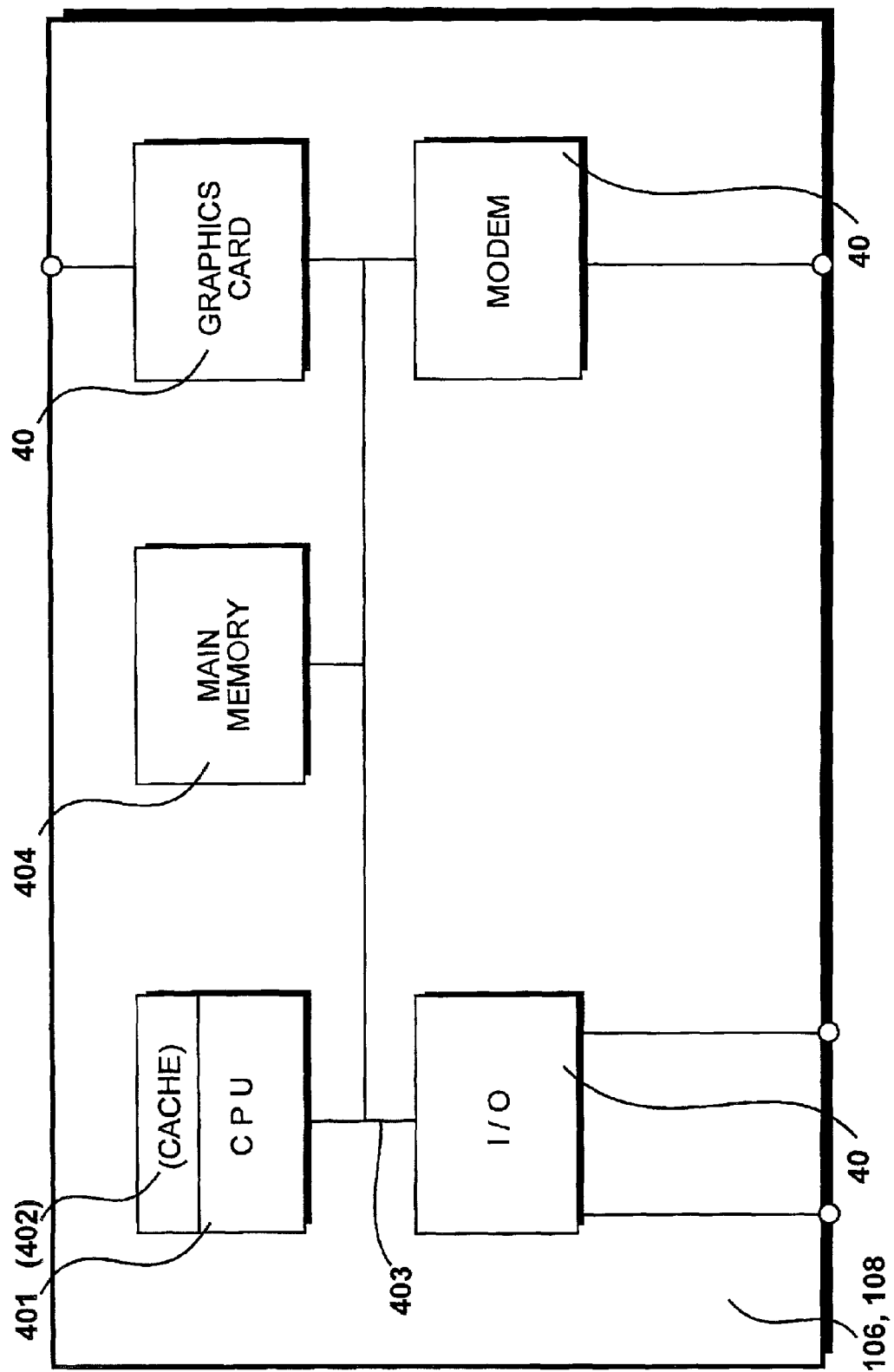
FIG. 4 illustrates the hardware architecture of a cellular phone or personal digital assistant shown in FIG. 2.

Hardware forming the main part of cellular phone 211 or Palmtop PC 221 are detailed in FIG. 4.

The system includes a central processing unit (CPU) 401 which fetches and executes instructions and manipulates data. Depending upon the manufacturer of the device, said CPU may or may not be equipped with a high speed cache memory 402 which stores frequently-accessed instructions and data. The central processing unit 401 is connected to a system bus 403, and said bus 403 provides connectivity with a larger main memory 404, which requires significantly more time to access than the cache 402 if present. Depending upon the manufacturer of the device, the main memory 404 contains between one and eight megabytes of dynamic random access memory, a portion of which is configured as non-volatile bulk storage of instructions and data. A graphics adapter 405 receives graphics data from the CPU 401. A serial input/output interface 406 provides connectivity to peripherals such as keypad 214, keys 224 and tactile components of display 223. A modem 407 provides connectivity to the Internet 102 via a wireless telephone connection to the user's ISP 107 or 109. The equipment shown in FIG. 4 constitutes a mobile computing device of fairly standard architecture, the type of which however can vary to a large extent, such as a cellular phone, a Palmtop PC, a Personal Digital Assistant etc. traditionally used as a mobile network terminal.

Figure 5:
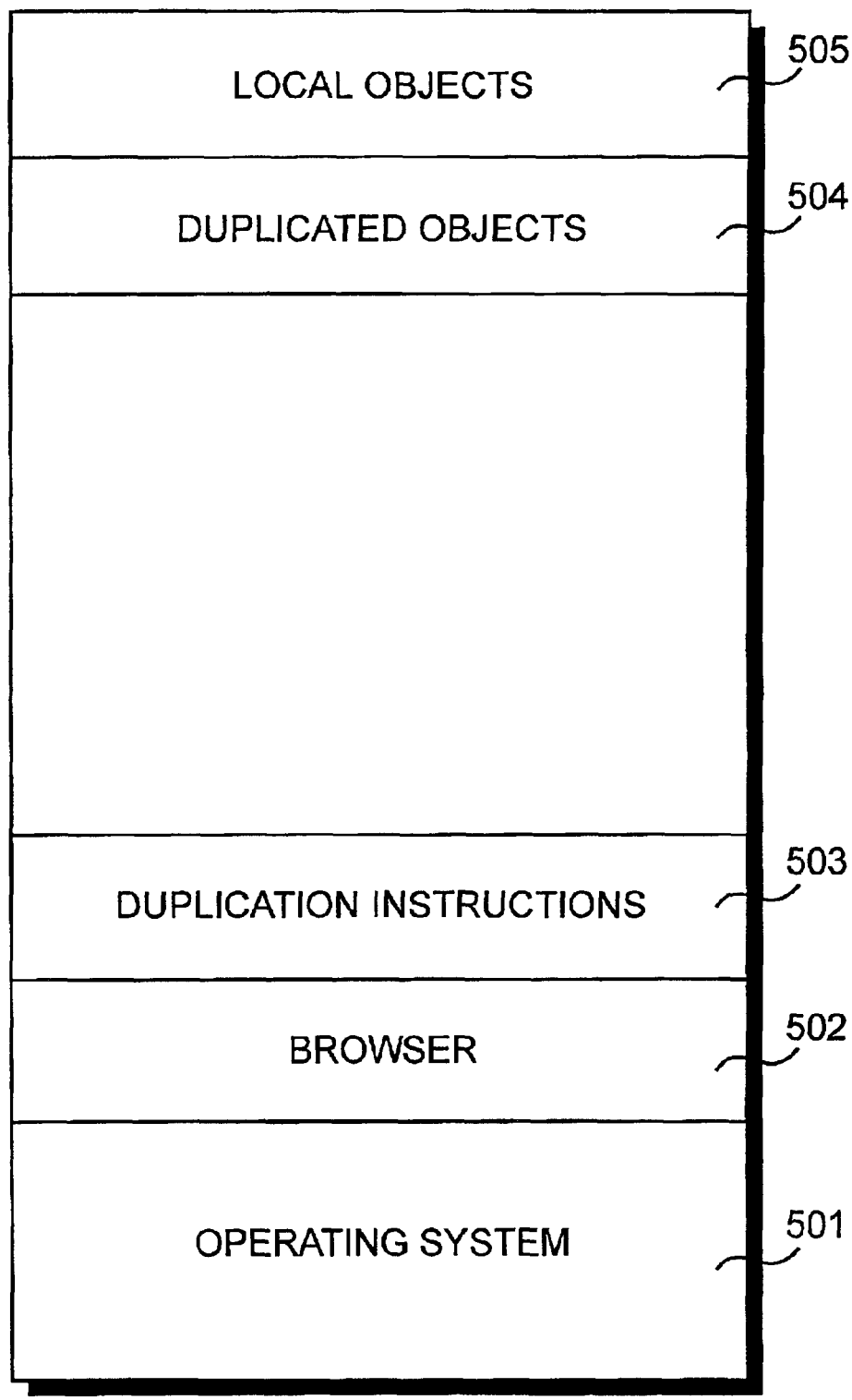
FIG. 5 details the contents of the memory of any one of the user terminals shown in FIGS. 3 and 4, including duplication instructions, duplicated objects and local objects.

The contents of the memory 304 or 404 of the user terminals 101, 104, 106 and 108 shown in FIGS. 1 to 4 are summarised in FIG. 5.

An operating system, including a basic BIOS is shown at 501. This provides common functionality shared between all applications operating on the user terminals 101, 104, 106 and 108, such as disk drive access for terminals equipped with disk drives, file handling and graphical user interfacing. A browser 502 include instructions for accessing and displaying Internet pages, consulting HTML or WAP files and other item, that are usually present but inactive on the user's graphical display.

Duplication instructions 503 comprise the program steps required by the CPUs 301 and 401 to act upon objects, the type of which comprise either local objects 504 or duplicated objects 505, also known as duplicas. Co-pending United Kingdom application number 00 26 095.0 of the present Assignee may be usefully consulted for reference to a more detailed description of duplicated objects and their functionality, which is not part of the present invention. In the preferred embodiment, instructions 503 enable the terminal user to equip a local object 504 with attributes, generally as an input string by means of keyboard 205 or mouse 206 or a combination thereof. For instance, said input string may take the form of one or a plurality of keywords typed in by the respective users of user terminals 101, 104, 106 and 108, or machine-readable text derived from said terminal user activating mouse 206 of user terminal 101 or 104 or stylus 225 of user terminal 108.

Figure 6:
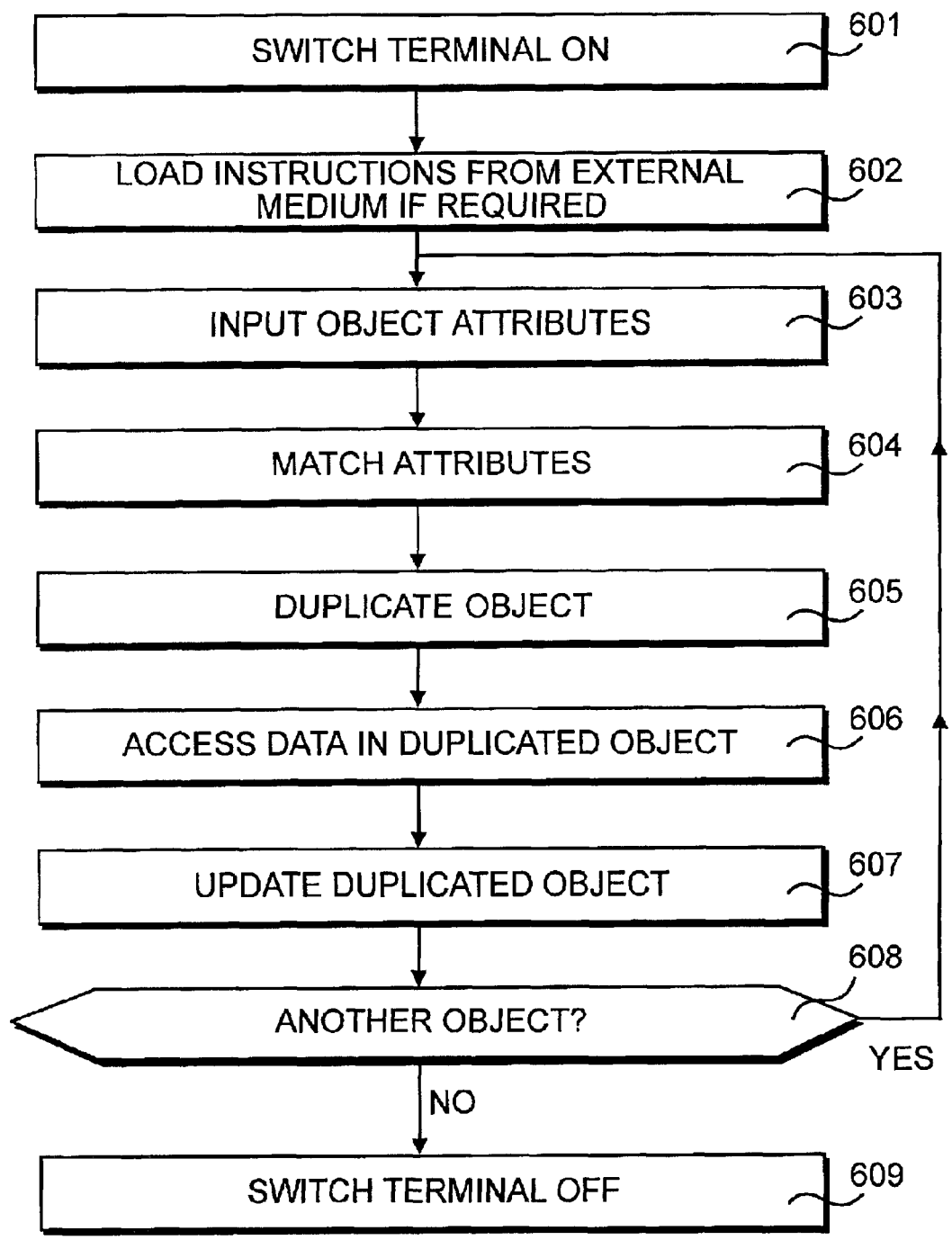
FIG. 6 summarises actions performed at a user terminal in order to equip local objects shown at FIG. 5 with attributes and sharing data according to the invention.

The actions performed by the duplication instructions 503 shown in the user terminal's main memory in FIG. 5 when logging onto a network such as network 102 is detailed in FIG. 6.

Upon activation of a user terminal at step 601, the instructions 503 necessary for the equipment of local objects with attributes and duplication and update thereof are loaded from an external medium, such as a CD-ROM or, in the case of a wireless internet-enabled mobile device such as cellular phone 106 and Palmtop PC 108, downloaded from a network, at step 602.

At step 603, the terminal user equips an object with attributes, such as an input string. For instance, the terminal user specifies criteria to be met by information sought regarding any particular geographical or topical point of interest. Upon completing the inputting action of step 603, duplication instructions 503 perform a matching operation at step 604, which compares the attributes of duplicated objects 505 stored in the main memory in order to identify duplicates with fully or partially matching attributes. Said attributes of duplicated objects 505 are eventually matched and, at step 605, duplication instructions 503 duplicate the publisher duplicated object onto the main memory of the user terminal from which the matching subscriber duplicated object was initially issued. Data, which may or may not constitute the attributes of the publisher duplicated object is subsequently accessed by the duplication instructions 503 at step 606.

At step 607, any amendments of the data and/or attributes of the publisher duplicated objects are forwarded by duplicated instructions 503 to every single duplica of said publisher duplicated object currently stored by user terminals logged onto the network.

A question is asked at step 608 which determines whether the terminal user wishes to equip another object with attributes, for instance to specify criteria to be met by information sought by said terminal user regarding a different particular geographical or topical point of interest. If the question asked at step 608 is answered positively, then control is directed back to step 603, wherein the terminal user inputs a new input string in order for a match to be performed. If the question at step 608 is answered negatively, then the user terminal is eventually switched off at step 609.

Duplication instructions 503 define the duplication space, publisher objects and subscriber objects and their functionality, and are shown in FIG. 7.

A source file is shown in FIG. 7 which contains CPU instructions in ASCII characters, such as to be comprehensible by a computer programmer. Accordingly, said source file enunciates a program name 701, programming language declarations 702 known to those skilled in the art as 'header files' and a 'void main' declaration 703 which indicates that the declarations which follow constitute the main program.

According to the invention, the header files 702 identify the various objects required by the promotion program and which will be processed by duplication instructions 503 on each user terminal, the CPU of which executes the promotion program. The "Define" declaration 704 instantiates the duplication space known as 'promotion space', within which publisher duplicated objects generated by terminal users offering promotions and subscriber duplicated objects generated by clients seeking promotions will be matched. User-specified variables and methods are then defined in ASCII characters by the programmer in order to confer the logic steps known as algorithm, appropriate to the topic of the promotion program, to the program.

The "Client::Create" declaration 705 instantiates the 'client' object as a duplicated object within the main memory of the client-subscriber terminal and the programmer accordingly specifies attributes such as variables and methods, or program steps, which will enable duplication instructions 503 to process the attributes of said client object as attributes of a subscriber duplicated object to whom matching publisher duplicated objects should be forwarded to. The "pClient→Publish" declaration 706 instantiates the 'client' object within the already instantiated duplication space known as 'promotion space' such that it can be duplicated on remote networked terminals and eventually matched with a relevant promotion.

Similarly, the "Promotion::Create" declaration 707 instantiates the 'promotion' object as a duplicated object within the main memory of the client-publisher terminal and the programmer accordingly specifies attributes such as variables and methods, or program steps, which will enable duplication instructions 503 to process the attributes of said promotion object as attributes of a publisher duplicated object to whom matching subscriber duplicated objects should be forwarded to. The "pPromotion→Publish" declaration 708 instantiates the 'promotion' object within the already instantiated duplication space known as 'promotion space' such that it can be duplicated on remote networked terminals and eventually matched with a relevant client.

The above instructions represented in ASCII format will be familiar to those skilled in the art, particularly programmers skilled in C or C++ programming language. The duplication space created by instructions 704 and the subscriber objects and publisher objects respectively instantiated by programming instructions 705 to 708 are graphically represented in FIG. 8.

The relationship between publishers of information and subscribers of information can be illustrated by a graph, with said subscribers ordained along the abscissa 801 and the publishers ordained along the ordinate 802, the duplication space being abstractly represented by the number of potential intersections between attributes of the subscriber objects, which are straight lines (803) parallel to the ordinate and perpendicular to the abscissa, and the attributes of the publisher objects, which are straight lines (804) parallel to the abscissa and perpendicular to the ordinate. The intersection of two of said respectively perpendicular lines 803, 804 identifies a match 805 between the attributes of a subscriber object and the attributes of a publisher object. Thus, with reference to the potential number of subscribers and publishers present at any one time on large networks such as the Internet 102, the duplication space potentially comprise millions of publisher and subscriber objects, the comparison of the respective attributes of which is non-trivial.

Figure 8:
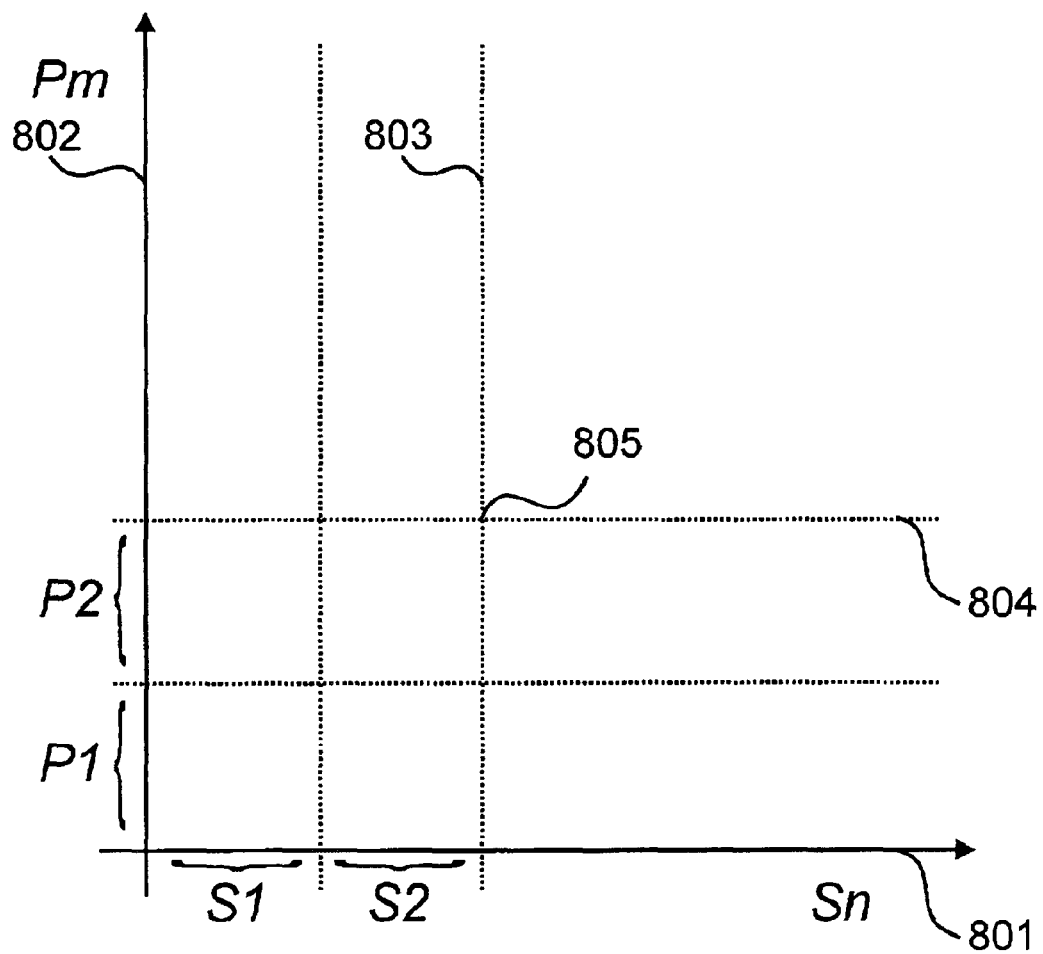
FIG. 8 provides a graphical presentation of the subdivision of the duplication space shown in FIG. 7 into cells.

In FIG. 8, an arbitrary number of two sets of publishers P1, P2 are identified from amongst the totality of publishers Pm. Sets P1, P2 are subsets of the totality Pm of the publishers present within the duplication space, and are for instance based upon thematic criteria. Similarly, two sets of subscribers S1, S2 are identified from amongst the totality of subscribers Sn. Sets S1, S2 are subsets of the totality Sn of the subscribers present within the duplication space, and are for instance also based upon thematic criteria. Said sets define four cells C1, C2, C3 and C4 implemented in order to reduce the problem posed by a potentially infinite duplication space, in terms of computational resources required to process attributes comparison and obtaining an attribute match. Said problem and the solution according to the present invention are illustrated in FIG. 9.

The totality of publishers Pm present within the duplication space can be expressed as the union of all the subsets P1, P2 etc. of publishers and thus as an expression 901:

$$Pm = P1 \cup P2 \cup \ldots Pm$$

Similarly, the totality of subscribers Sn present within the duplication space can be expressed as the union of all the subsets S1, S2 etc. of subscribers and thus as an expression 902:

$$Sn = S1 \cup S2 \cup \ldots Sn$$

As was previously explained, a cell can be understood as the range of potential attributes matching between the attributes of the publisher objects of a particular publisher set and the attributes of the subscriber object of a particular subscriber set. Thus, in the case of the publisher set P1 and the subscriber set S1, we arrive at the following formula 903:

$$C1,1 = P1 \cup S1$$

Accordingly, cell C2 represents the range of potential attributes matching between the attributes of the publisher objects of publisher set P2 and the attributes of the subscriber objects of subscriber set S1 and so on and so forth. Thus, for any given set S1 of subscribers, its relationship with the publishers within the duplication space can be written as the expression 904:

$$C1,m = S1 \cup Pm$$

and, reciprocally, for any given set P1 of subscribers, its relationship with the subscriber within the duplication space can be written as:

$$Cn,1 = Sn \cup P1$$

The relationship between the number of cells within the duplication space and the sets of publishers and subscribers can therefore be written as the expression 905:

$$Cn,m = Sn \cup Pm$$

wherein a number (n×m) of cells are defined. Therefore, the implementation of the duplication space without cells would signify that one terminal connected to the network must process the attributes of every publisher and subscriber object within said duplication space with a processing load R placed upon it according to the expression 906:

$$R = C(P) \times C(S)$$

in order to perform the matching operation. By dividing the general duplication space according to better-defined criteria which are relevant to the domain of application of the program itself, and thus instantiating publisher and/or subscriber subsets, the comparison process required in order to obtain a situation of attributes matching is facilitated and the load R placed on the duplication instructions 503 of each user terminal connected to the network and controlling the duplicate master of a cell in order to perform said matching action is further reduced according to the general expression 907:

$$R = [C(S) \times C(P)] + (n \times m)$$

Referring back to FIG. 7, wherein an example of program instructions written in the programming language C++ was provided, which instantiated a 'promotion space' which itself may now be understood as a cell within the duplication space, and instantiated subscriber client objects and publisher promotion objects, an additional programming declaration "DoCell" would need to be implemented between instructions 704 and 705 in order to further divide the cell known as 'promotion space' into more discrete cells. In the example, the 'promotion space' cell could be subdivided into four subsets, for instance a 'money' subset (corresponding to publishers offering promotions based on price and subscribers seeking out said price-based promotions), a 'quantity' subset (corresponding to publishers offering more goods or services for a specified amount of currency and subscribers seeking out said offers), an 'incentive' subset (corresponding to publishers offering gifts and other incentives to their customers and subscribers seeking such offers) and a 'competition' subset (corresponding to publishers running a prize draw to attract customers and subscribers seeking such offers).

For each of said subsets, we know that a publisher in 'promotion space' cell and 'money' subset can only match a subscriber also in 'promotion space' cell and 'money' subset and thus, the processing load expressed at 907 is further alleviated according to the expression 908:

$$Cn,n = Sn \cup Pn$$

wherein only a number n of cells are defined, and not (n×m) as previously.

Figure 10:
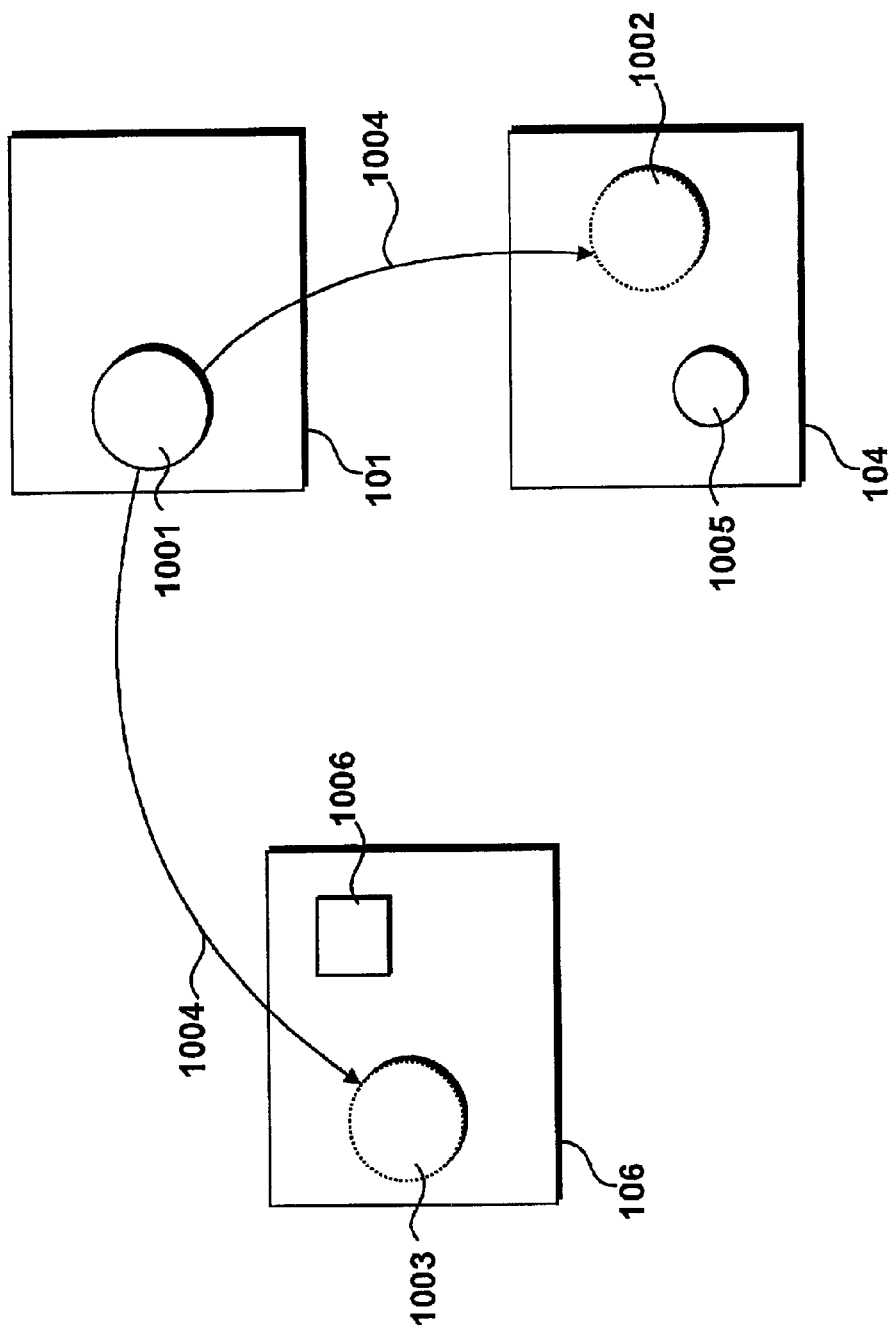
FIG. 10 provides a graphical presentation of the respective main memories of the user terminal shown in FIGS. 1, 3 and 4 upon logging onto the network shown at FIG. 1.

The duplication space will be better understood when observing the initialisation of the main memory of each terminal logging onto the network according to steps 601 and 602, which is shown in FIG. 10.

Upon user terminals 101 and 104 being switched on at step 601 and similarly, cellular telephone 106 also being switched on at step 601, the duplication instructions 503 are loaded into their respective main memories either by means of CD ROM drive 308 in the case of user terminals 101 and 104 or, downloaded from the network in the case of cellular telephone 106. Said loaded instructions include CPU instructions 701 to 707 which have been previously compiled into binary instructions, such that the respective CPU's of said user terminals and cellular telephone are able to process them. In the example, the entirety of the instructions loaded from said external medium forms an executable program, the primary function of which is to enable a terminal's user to either publish promotional offers and thus become a publisher within the duplication space, or access said promotional information, and thus become a subscriber within the duplication space. Accordingly, the first user terminal on the network to instantiate the cell known as 'promotion space' 704 in effect hosts the duplicate master 1001 of the duplication space within the network. As said 'promotion space' 704 is defined by the duplication instructions 503, and potentially further subdivided into a number of cells 902, the duplication space object 1001 is permanent and thus always exists on the network, to the contrary of the publisher objects and subscriber objects which will be detailed further below.

In the example, user terminal 101 is the first terminal to instantiate the promotion space and, as the 'promotion space' object stored in the main memory of user terminal 101 is the duplication master 1001 of said 'promotion space' object instantiated by each terminal connected to the network and executing the same instructions 503, it thus updates the 'promotion space' instantiations 1002 and 1003 stored within the main memories of user terminal 104 and cellular telephone 106 respectively, which are known as duplicas. Co-pending United Kingdom patent application Number 00 26 095.0 of the present Assignee may be usefully consulted for reference to a more detailed description of duplicated objects and their functionality, which is not part of the present invention.

The updating activity 1004 between the duplicate master 1001 of the 'promotion space' and the duplicas 1002 and 1003 of said promotion space is thus established and the duplication space object now exists and is shared by user terminals 101, 104 and 106.

Referring back to FIG. 6, terminal users equip objects with attributes by means of an input string at step 603. Depending upon the class 706, 707 of objects selected by the terminal user for attributes equipping, said object is either a publisher object or a subscriber object. In the example, the user of network terminal 104 is a stock exchange trader and selects a promotion object 707 in order to equip it with a "two-for-one share offer" promotion. Upon completing the equipping of the promotion object 707 with attributes pertaining to said "two-for-one share offer", a publisher object 1005 is created at user terminal 104 and subsequently stored as a local object 505 in its main memory.

The user of user terminal 106, which is a cellular telephone, is also a stock exchange trader and is on the lookout for such share-based promotional offers. Consequently, said user selects a client object 706 and equips it with attributes pertaining to the identification of promotion "two-for-one share offer promotions" by means of an input string entered on keypad 214 according to step 603. Upon completing the object attributes inputting operation 603, a subscriber object 1006 is thus created at user terminal 106 and stored as a local object 505 in its main memory. According to the invention, publisher objects and subscriber objects are matched within the duplication space according to their attributes at step 604, which is further detailed in FIG. 11.

Upon instantiating either a publisher object or a subscriber object equipped with attributes, the duplication instructions 503 access said attributes in the new local object 505 at step 1101 in order to answer a question asked at step 1102 which determines whether said attributes of the new local object match the cell attributes. In the example, attributes of the "two-for-one share offer" publisher object 1005 are processed to determine whether said object belongs to the 'promotion space' object 1003. If the question asked at step 1102 is answered negatively, then control is returned to step 1101 and duplication instructions 503 access attributes in another local object 505 until such time as question 1102 is answered positively.

When the question asked at step 1102 is answered positively, duplication instructions 503 send a duplica of object 505 to the host of the duplicate master of the cell at step 1103. At step 1104, said host of the duplicate master of the cell receives the duplica of the publisher object or subscriber object and selects the next duplicated object 504 stored in its main memory. Upon completing said selection step, the duplication instructions 503 of the host access attributes within the selected duplicated object at step 1105 in order to compare them with the attributes of the duplica received at step 1103, at step 1106.

At step 1107, a question is asked as to whether the attributes of the duplica received and the attributes of the duplica selected at step 1104 respectively match. In effect, duplication instructions 503 establish whether the input string or, potentially, executable instructions which form part of the attributes of the duplicated object, which say is a publisher object, are present within the input string or potentially, executable instructions which form part of the attributes of another duplicated object which say is a subscriber object. Thus, if the question asked at step 1107 is answered in the negative, control is returned to step 1104 wherein duplication instructions 503 select the next duplicated object 504 present in the main memory in order to perform another comparison, such that the question asked at step 1106 is eventually answered in the positive.

Figure 11:
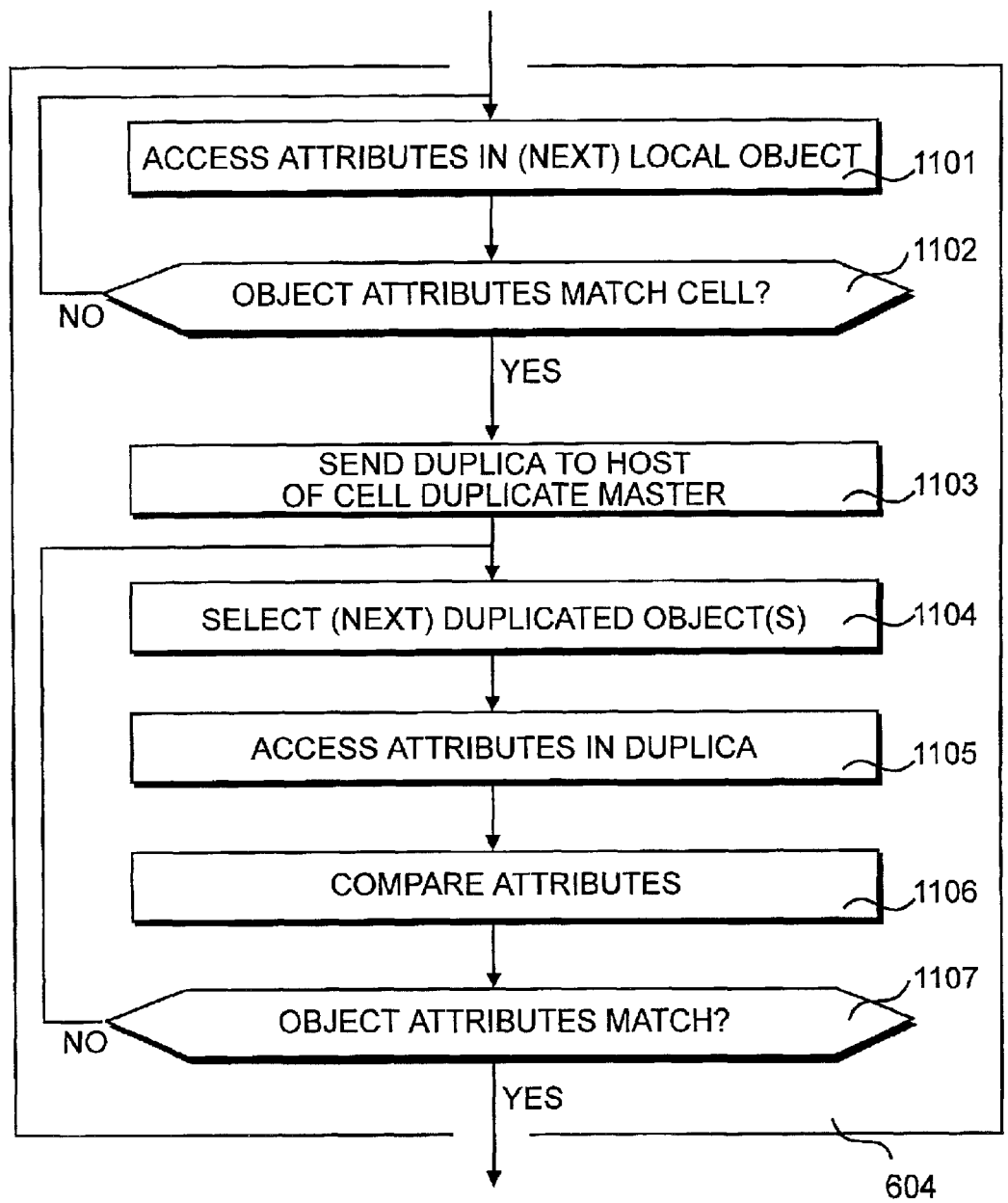
FIG. 11 summarises actions performed at a user terminal in order to perform the attributes matching function shown in FIG. 6.
Figure 12:
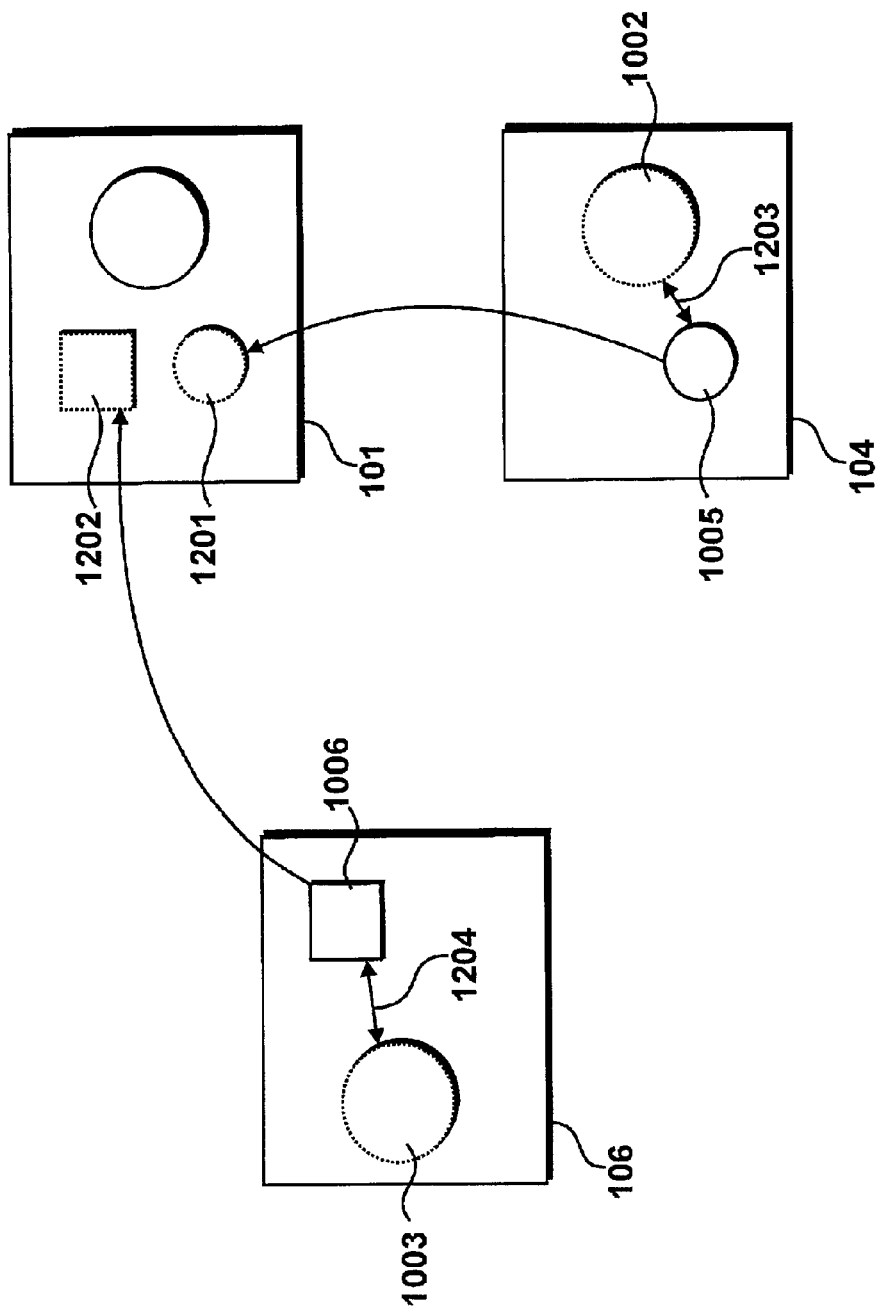
FIG. 12 provides a graphical presentation of the memories shown in FIG. 10 subsequently to the actions shown at FIG. 11.

A graphical representation of the duplicated objects as shown in FIG. 10 subsequently to the actions detailed in FIG. 11 is provided in FIG. 12.

The attributes of the "two-for-one share offer" publisher object 1005 are identified (1203) as matching the attributes of the 'promotion space' cell duplica 1002 and thus the "two-for-one share offer" publisher object 1005 is duplicated by the duplication instructions 503 stored in the main memory of user terminal 104 at user terminal 101, the main memory of which stores the duplicate master 1001 of the 'promotion space'. Consequently, a publisher object duplica 1201 is instantiated in the main memory of user terminal 101 as a duplicated object 504.

Likewise, the attributes of the "two-for-one share offer request" subscriber object 1006 are identified (1204) as matching the attributes of the 'promotion space' cell duplica 1003 and thus the "two-for-one share offer request" subscriber object 1006 is duplicated by the duplication instructions 503 stored in the main memory of user terminal 106 at user terminal 101, the main memory of which stores the duplicate master 1001 of the 'promotion space'. Consequently, a subscriber object duplica 1202 is instantiated in the main memory of user terminal 101 as a duplicated object 504. Both of duplicated objects 1201 and 1202 are respectively updated by their duplicate master 1005 and 1006, such that any changes implemented locally at user terminal 104 or user terminal 106 respectively, to the attributes of the objects which are duplicate masters are instantly propagated to their duplicas stored in user terminal 101.

Figure 13:
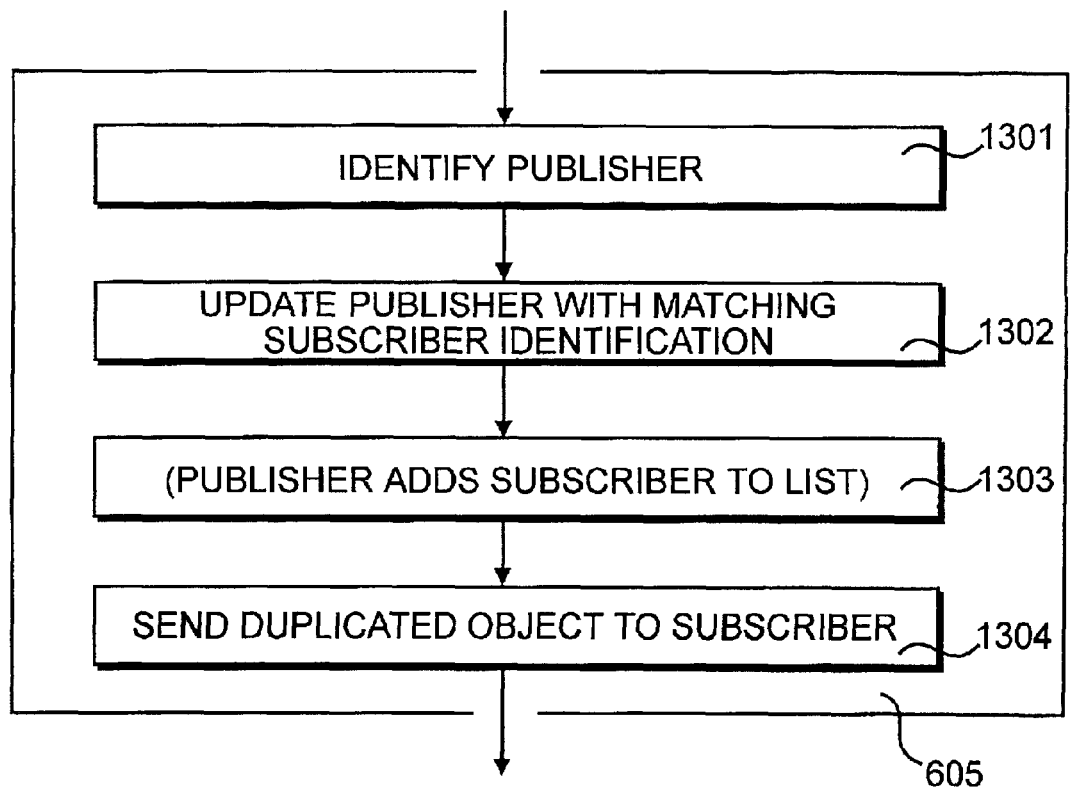
FIG. 13 summarises actions performed at a user terminal in order to perform an object duplication operation shown in FIG. 6.

Referring back to FIG. 6, upon completing the attribute matching operation of step 604, the duplication instructions 503 stored in the host of the duplicate master of the cell subsequently duplicate the matching object at step 605, further details of which are shown in FIG. 13.

Upon answering the question asked at step 1105 positively, duplication instructions 503 stored in the main memory of the user terminal which stores the duplicate master 1001 of the cell identify the publisher of the publisher object duplica 1201 at step 1301. Once identified, said publisher is updated with the identification and details of the matching subscriber at step 1302. In effect, the duplication instructions 503 stored in the main memory of the host of the cell duplicate master, of the duplicate space send a string to the duplication instructions 503 of the host of the duplicate master of the publisher object with the network address of the host of the duplicate master of the matching subscriber object.

Figure 14:
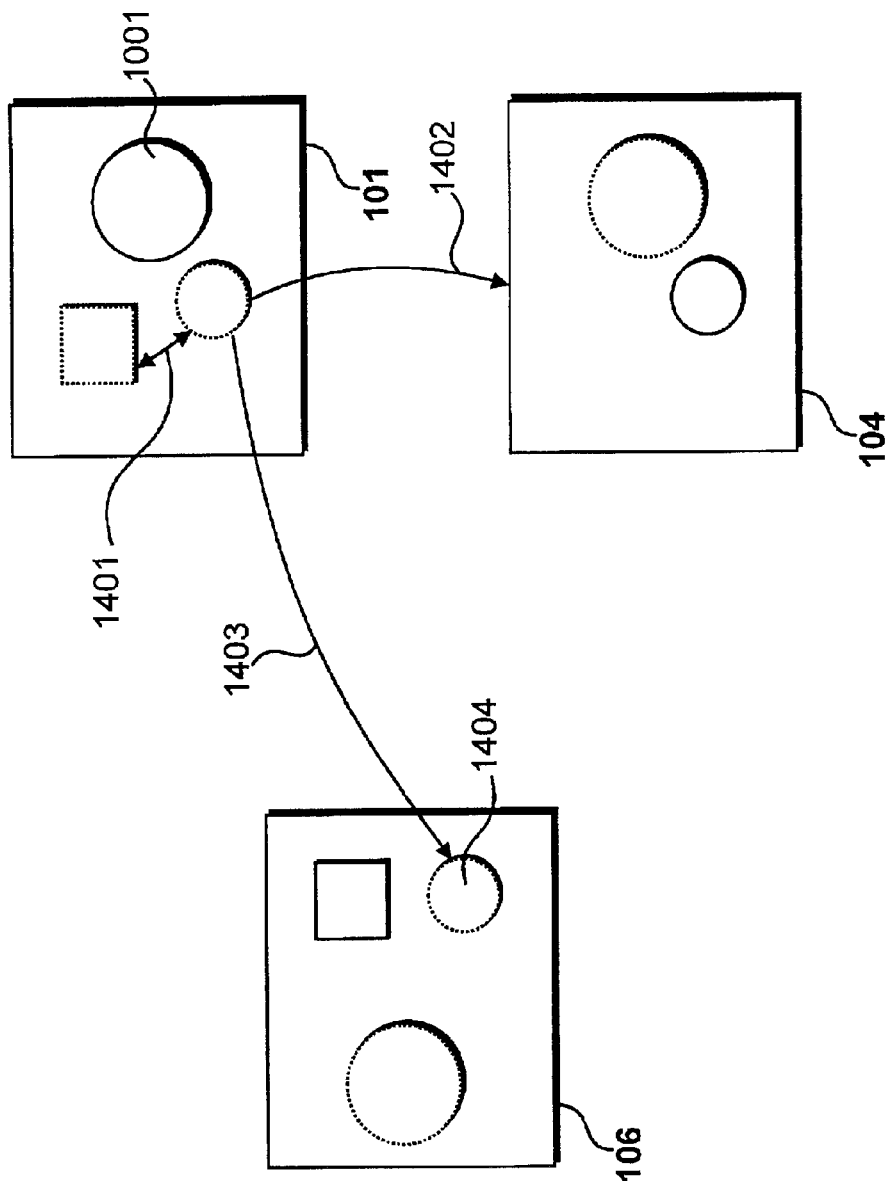
FIG. 14 provides a graphic presentation of the main memories shown in FIG. 12 subsequently to the actions shown in FIG. 13.

At step 1303, the duplication instructions 503 stored in the main memory of the host of the duplicate master of the publisher object, add the matching subscriber to the list of current recipients of duplicas of the publisher object which require update from its duplicate master. Further to carrying out the updating operation of step 1302 and whilst the host of the duplicate master of the publisher object carries out the updating operation of step 1303, the host of the duplicate master of the cell duplicates the publisher duplica 504 at the host of the duplicate master of the matching subscriber object at step 1304. A graphical representation of the duplicated objects shown in FIG. 12 subsequently to the actions shown in FIG. 13 is provided in FIG. 14.

As user terminal 101 stores the cell duplicate master 1001 and therefore receives the duplicate 1201 of the "two-for-one share offer" publisher object 1005 from user terminal 104 and the duplicate 1202 of the "two-for-one share offer request" subscriber object 1006 from user terminal 106, the duplication instructions 503 stored in user terminal 101 subsequently match (1401) the "two-for-one share offer" portion of the respective attributes of duplicas 1201 and 1202. Consequently, said duplication instructions 503 identify user terminal 104 as the publisher of publisher object duplica 1201 according to step 1301 and update (1402) the duplication instructions 503 stored in user terminal 104 with the identification and details of user terminal 106, as said user terminal 106 stores the duplicate master 1006 of the matching subscriber object 1202. Duplication instructions 503 subsequently duplicate (1403) publisher object 1201 at user terminal 106, which thus instantiates a "two-for-one share offer" publisher object 1404 in its main memory.

In effect, upon equipping a client object 706 with attributes and thus initialising a subscriber object 1006 by means of keypad 214, the user of user terminal 106 has generated a search request with a specific criteria, with said criteria being the attribute of its subscriber object and subsequently receives a search result 1404 which is processed by local duplication instructions 503 and graphically displayed on visual display unit 213 by means of browser 502. As publisher object 1404, stored in the main memory of user terminal 106 is a duplicate of publisher object 1005, and user terminal 104 which stores the duplicate master of publisher object 1005 has been updated with details about the host of matching subscriber object duplica 1202, said duplication master 1005 is now in a position to update duplica 1404 stored in user terminal 106. Details of the update of the duplicate by their respective duplicate master, as according to step 607, are further detailed in FIG. 15.

Upon updating the list of duplica recipients according to the string received from the host of the duplicate master of the cell as according to step 1303, the user terminal which stores the duplicate master of the publisher objects answers a question asked at step 1501 which determines whether the attributes of a local object 505 have been modified. If the question asked at step 1501 is answered in the positive, then duplication instructions 503 stored in said user terminal which stores the duplicate master subsequently updates all of the duplicas relating to said duplicate master with the attribute modifications at step 1502. In order for the user terminal which stores the duplicate master of the cell to more accurately perform the matching operation of step 604, said duplicate master of publication object also updates its duplica stored on said terminal at step 1503.

Alternatively, if the question asked at step 1501 is answered negatively, then the process is directed to the following step 1504, wherein a question is asked in order to determine whether the keep-alive signal perpetuated between a duplicate master and its respective duplicas has returned a failure status or not. If the question asked at step 1504 is answered in the positive, which then can be translated as the terminal the main memory of which hosts the duplicate master has logged-off the network or shutdown, then at step 1505 the duplication instructions 503 of every user terminal on the network which stores a duplica of the now defunct duplication master execute a poll operation in order to identify the 'cell' duplica most able to take on the role of 'cell' duplicate master and, subsequently, switch the state of the identified 'cell' duplica to the state of 'cell' duplicate master at step 1506.

Figure 15:
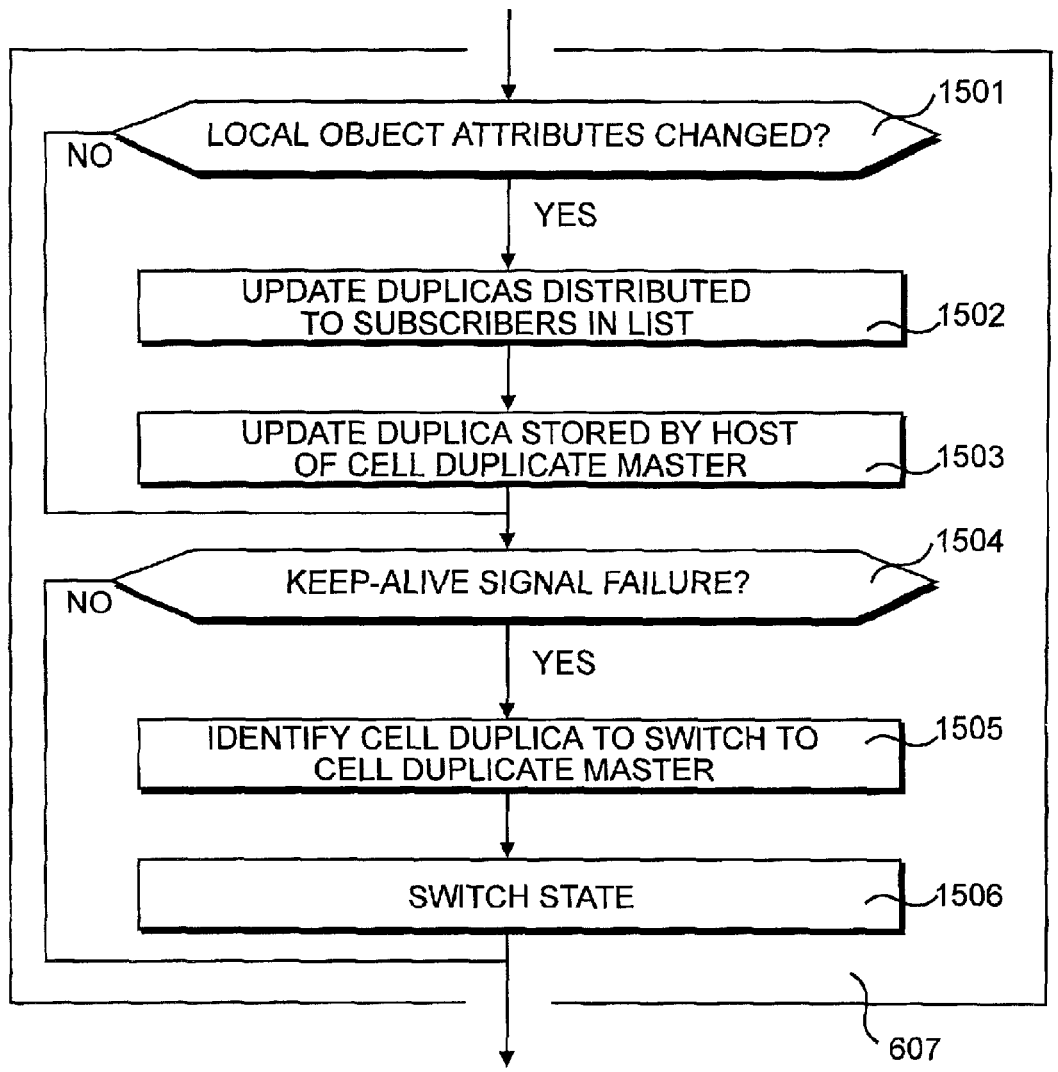
FIG. 15 summarises actions performed at a user terminal in order to perform the duplicated object update operation shown in FIG. 6.
Figure 16:
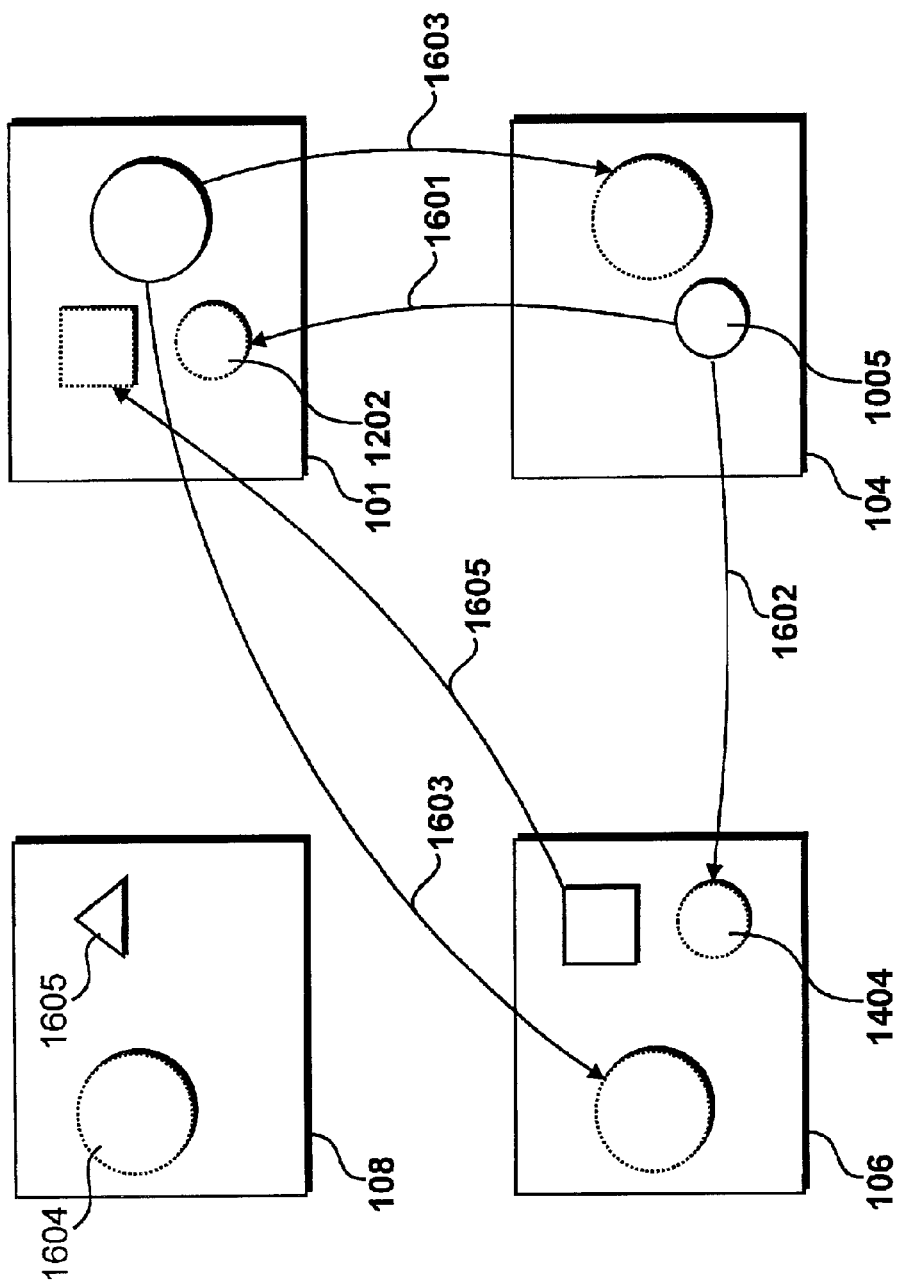
FIG. 16 provides a graphical presentation of the main memories shown in FIG. 14 subsequently to the operations shown at FIG. 15.

Alternatively, if the question asked at step 1504 is answered negatively, then the process is directed to the next step 608, wherein duplication instructions 503 determine whether another object requires equipping with attributes or updating, and the user terminal is eventually switched off as at step 609. A graphical representation of the duplicated objects shown in FIG. 14 subsequently to the actions shown in FIG. 15 is provided in FIG. 16.

It is established that duplication master 1005 stored in user terminal 104 is in a position to update duplica 1404 stored in user terminal 106 according to steps 1501 through to 1503, upon completing steps 603 through to 605. Thus, the "two-for-one share offer" publisher object 1001 provides "two-for-one share offer" duplicas 1201 and 1404 respectively stored in user terminals 101 and 106 with respective updates 1601, 1602, should any change be implemented to the attributes of said "two-for-one share offer" publisher object by the user of user terminal 104. Similarly, any changes implemented to the attributes of the 'promotion space' object 1001 would be implemented on the duplicas 1003 and 1005 by means of update actions 1603 and 1604 respectively. Finally, any changes implemented to the attributes of "two-for-one share offer" request subscriber object 1006 would be implemented to the attributes of its respective duplica 1202 by means of update 1605.

Figure 17:
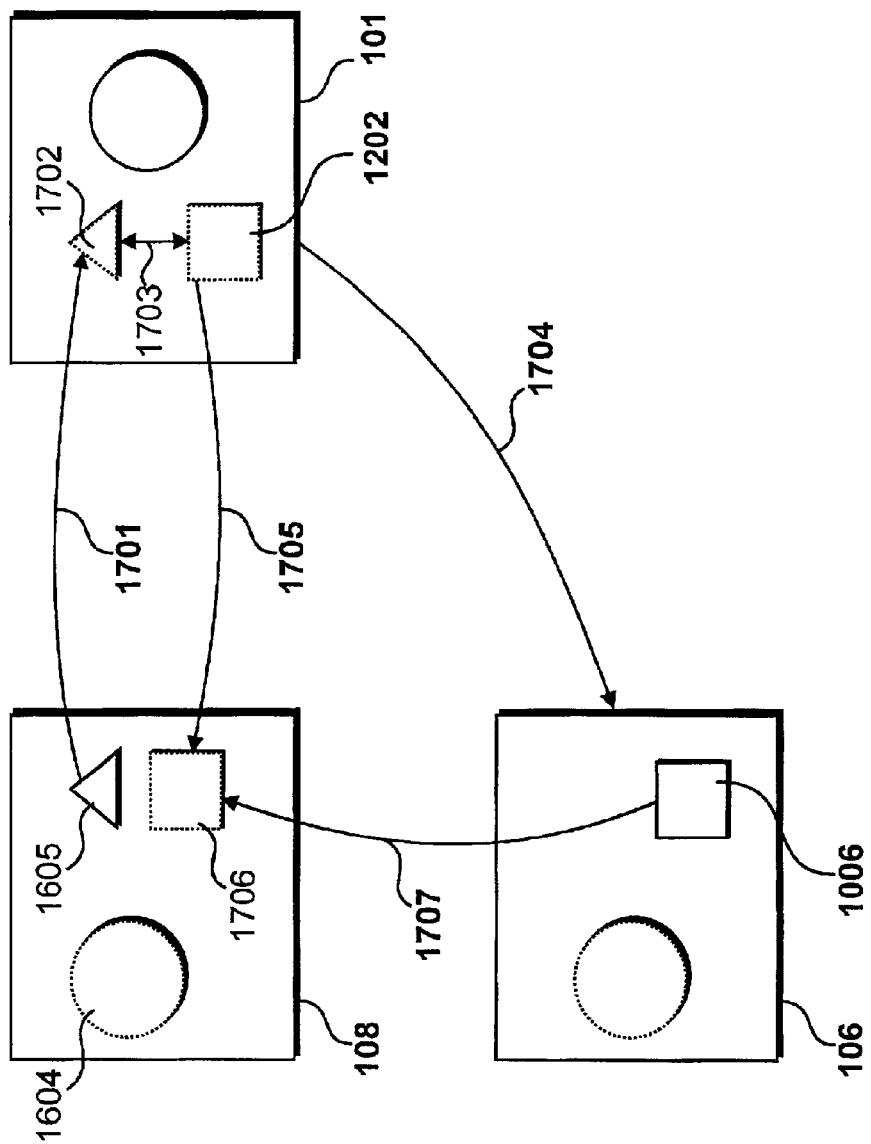
FIG. 17 provides a graphical presentation of the main memories shown in FIG. 16 subsequently to a publishing terminal going off line and a new terminal logging onto the network shown at FIG. 1.

In the example, it can be observed that user terminal 108 has been switched on, logged onto the network and loaded instructions including duplication instructions 503 which themselves include executable instructions 701 through to 707. Consequently, the graphical representation of the main memory of user terminal 108 shows a duplica 1604 of the 'promotion space' 704, the attributes of which are updated by 'promotion space' duplicate master 1001. In the example shown, the user of network terminal 108 is a financial editor who seeks information about what specific types of promotions stock market traders are interested in. Accordingly, a subscriber object 1605 is shown in the graphical representation of the main memory of user terminal 108, which includes attributes inputted for this purpose, and said objects may thus be known as a "type of share promotion" subscriber object. The matching of the attributes of subscriber object 1605 and sharing thereof according to the invention are illustrated in FIG. 17.

According to the invention, upon completing the equipping of the "type of share promotion" subscriber object with appropriate input string or executable instructions and matching said attributes with the attributes of the 'promotion space' duplica 1604, said "type of share promotion" subscriber object 1605 is duplicated (1701) at user terminal 101. Consequently, a subscriber object duplica 1702 is instantiated in the main memory of user terminal 101 as a duplicated object 504. As user terminal 101 already stores the duplica 1201 of the "two-for-one share offer" request subscriber object 1006, stored in user terminal 106, the duplication instructions 503 stored in user terminal 101 subsequently match (1703) the "share offer request" portion of the respective attributes of duplicate 1201 and 1702. In a preferred embodiment of the present invention, the matching of the attributes of a new subscriber object with the attributes of an already-existing subscriber object switch the state of said existing subscriber object to that of a publisher object. Accordingly, duplication instructions 503 identify user terminal 106 as the publisher of publisher object duplicate 1202 according to step 1301 and thus updates (1704) the duplication instructions 503, stored in user terminal 106, with the identification and details of user terminal 108 as said user terminal 108, stores the duplicate master 1605 of the matching subscriber object 1702. Duplication instructions 503 subsequently duplicate (1705) publisher object 1202 at user terminal 108, which thus instantiates a "two-for-one share offer request" publisher object 1706 in its main memory.

According to the invention, duplicate master 1006 eventually updates (1707) duplica 1706 of the "two-for-one share offer request" publisher object stored in user terminal 106.

It can be observed that user terminal 104 is not present on the network anymore. As said user terminal 104 stored a duplica of the promotion space 1001, the failure of its keep-alive signal is of no significance. However, the failure of the keep-alive signal of the duplication master 1005 which was stored therein has prompted duplication instructions 503 respectively stored in user terminal 101 and 106 to discard duplicas 1201 and 1404 respectively, as publisher object and subscriber object are not configured to be persistent on the network.

Therefore, according to the present invention, there is provided an apparatus for sharing data over a network within which the accuracy of the matching operation performed in order to relate information publishing and subscribing is vastly improved over the prior art. Indeed, search results returned by the duplication instructions of the user terminal which stores the duplicate master of the duplication space only ever include information published at the time or near the time of a search and thus do not include information which is potentially years or months old. Similarly, as the duplication space can be instantiated with geographical, topical or logical restrictions, expressed as attributes, the potentially millions of redundant search results generated on the basis of a Boolean parameter-driven search are avoided, as the search is conducted within a volume of information already delimited as relevant and identified.

What is claimed is:

1. Apparatus for sharing data over a network, having a plurality of work-connected terminals, each comprising,
   visual display means;
   processing means;
   storage means; and
   memory means; wherein
   said memory means is configured to store program instructions for equipping objects stored therein with attributes and for managing the duplication of said objects;
   said processing means is configurable by said program instructions to perform the steps of
   equipping an object with attributes at a first of said network terminals;
   at a second of said network terminals, matching said object attributes of said first terminal with the attributes of an object amongst all of the objects stored in said second terminal;
   duplicating said object from said second terminal to said first terminal;
   at said first terminal, accessing data in said duplicated object using locally executed object instructions; and
   maintaining data consistency between said duplicated objects.

2. Apparatus according to claim 1, wherein said objects are duplicated objects.

3. Apparatus according to claim 1, wherein any of said duplicated objects is either a duplica updated by a duplicate master or a duplicate master which updates its respective duplicates.

4. Apparatus according to claim 1, wherein said duplicated objects are subscriber duplicated objects or publisher subscriber objects.

5. Apparatus according to claim 1, wherein said equipping of objects with attributes determines whether said objects are subscriber duplicated objects or publisher subscriber objects.

6. Apparatus according to claim 1, wherein said second of said network terminals stores the duplicate master of a cell duplicated object.

7. Apparatus according to claim 6, wherein said first network terminal stores a duplica of said cell duplicated object.

8. Apparatus according to claim 1, wherein said object of said first terminal at said second of said network terminals is a duplica of said object at said first terminal.

9. Apparatus according to claim 1, wherein said all of the objects stored in said second terminal are duplicas, with the exception of the cell duplicated object which is a duplicate master.

10. Apparatus according to claim 1, wherein the potential number of matches resulting from said matching operation between objects amongst said all of the objects stored in said second terminal embodies a duplication space.

11. A method of sharing data over a network, having a plurality of network-connected terminals, each comprising memory means and processing means, said memory means including instructions for equipping objects stored therein with attributes and managing the duplication of said objects, including steps of
   equipping an object with attributes at a first of said network terminals;
   at a second of said network terminals, matching said object attributes of said first terminal with the attributes of an object amongst all of the objects stored in said second terminal;
   duplicating said object from said second terminal to said first terminal;
   at said first terminal, accessing data in said duplicated object using locally executed object instructions; and
   maintaining data consistency between said duplicated objects.

12. Method according to claim 11, wherein said objects are duplicated objects.

13. Method according to claim 11, wherein any of said duplicated objects is either a duplica updated by a duplicate master or a duplicate master which updates its respective duplicas.

14. Method according to claim 11, wherein said duplicated objects are subscriber duplicated objects or publisher subscriber objects.

15. Method according to claim 11, wherein said equipping of objects with attributes determines whether said objects are subscriber duplicated objects or publisher subscriber objects.

16. Method according to claim 11, wherein said second of said network terminals stores the duplicate master of the duplication space duplicated object or the duplicate master of the cell duplicated object.

17. Method according to claim 16, wherein said first network terminal stores a duplica of the duplication space duplicated object or the cell duplicated object.

18. Method according to claim 11, wherein said object of said first terminal at said second of said network terminals is a duplica of said object at said first terminal.

19. Method according to claim 11, wherein said all of the objects stored in said second terminal are duplicas, with the exception of the cell duplicated object which is a duplicate master.

20. Apparatus according to claim 11, wherein the potential number of matches resulting from said matching operation between objects amongst said all of the objects stored in said second terminal embodies a duplication space.

21. A computer-readable medium having computer-readable instructions executable by a computer such that, when executing said instructions, a computer will perform the steps of equipping an object with attributes;

matching said object attributes with the attributes of an object amongst all of the objects stored in another of said computer;

duplicating said object from said another computer to said computer;

at said computer, accessing data in said duplicated object using locally executed object instructions; and maintaining data consistency between said duplicated objects.

22. A computer-readable memory system having computer-readable data stored therein, comprising local objects;

duplicated objects; and program instructions to:

(a) equip an object with attributes;

(b) match said object attributes with the attributes of another object;

(c) duplicate said other object to said memory system;

(d) access data in said duplicated object using locally executed object instructions; and (e) maintain data consistency between said duplicated objects.

* * * * *